Patented May 22, 1945

2,376,578

UNITED STATES PATENT OFFICE 2,376,578

BRAZING ALLOY

Walter A. Dean, Lakewood, Ohio, assignor to Aluminum Company of America, Pittsburgh, Pa., a corporation of Pennsylvania No Drawing. Application March 10, 1943, Serial No. 478,650

3 Claims. (Cl. 75—173)

This invention relates to filler metal alloys to be used in the fusion joining of metal members, and it is more particularly concerned with the provision of a filler metal composition adapted for brazing aluminum and aluminum base alloy members.

One of the common methods of joining metal members is to fuse another metal of lower melting point between the abutting edges or faces of the members being joined and allow the metal to solidify, thus establishing a rigid metallic bond between the members. The joining of metal members in this manner is here referred to as fusion joining. The types of fusion joining are generally classified according to the temperature range within which the operation is conducted. Soft soldering is carried out in a relatively low temperature range, usually below about 500° F., without fusion of the members being joined. Brazing is done at a somewhat higher temperature and generally without fusion of any of the metal members. In contrast to the two preceding practices, welding is performed at a still higher temperature and a very small portion of the metal members is actually fused at the edges of the joint. In all three methods a flux is generally preferred for the dual purpose of removing superficial oxide films or other non-metallic impurities and promoting the spread of the fused metal. Because of the difference in the temperature ranges at which these various joining operations are conducted, different techniques are followed in effecting a joint.

The brazing of aluminum and aluminum base alloys is a comparatively recent development because of the difficulty of removing the oxide film on the surface of the aluminum. A further difficulty arises in the brazing of age hardening aluminum base alloys which receive solution and subsequent age hardening treatments to develop their maximum tensile strength and hardness because brazing of such alloys must be done within the solution heat treating temperature range of about 800 to 1000° F. and generally below the temperature of incipient fusion of any of the constituents of the alloy if adverse effects of overheating are to be avoided. Brazing these alloys above about 1000° F. generally causes marked incipient fusion of some of their constituents with consequent loss in strength and resistance to corrosion as well as softening the metal to the point where undesirable distortion occurs. On the other hand, even if a suitable filler metal were available having a melting point below 800° F. it still would not be possible to satisfactorily braze such alloys at solution heat treating temperatures because the filler metal would run away from the joint where the joint had been made previous to solution heat treatment or if a jointing were attempted during this thermal treatment. To use such a low melting filler metal in making a joint on material which has received a solution heat treatment and has been cooled to room temperature would vitiate the benefits gained from the solution heat treatment, at least in the neighborhood of the joint. These drawbacks are especially evident in furnace brazing practice. It would be advantageous, therefore, to have a filler metal which melts above 800° F. but below 1000° F. and thus permit combining the brazing and solution heat treating operations; however, no known satisfactory filler metal has been available for making joints within the aforesaid temperature range.

In brazing metal members it is necessary that the filler metal should have a melting point close to the temperature at which the brazing is done in order to obtain a rigid structure shortly after the brazed assembly has been withdrawn from the heating medium. The use of a soft solder or similar low melting point alloy as a filler metal in place of the higher melting point filler metals mentioned hereinafter has certain inherent disadvantages in addition to those mentioned above regarding filler metals melting below 800° F. Among the most important of these disadvantages is the fact that the filler metal remains molten over a substantial temperature interval when the brazed assembly is cooled to room temperature after removal from the brazing furnace or other heating means. If such an assembly is chilled, the fused filler metal may crack as it freezes, thus making an unsound joint, or even no joint at all, that is, the members of the assembly may not even adhere to each other. Furthermore, the fact that the joint does not become rigid immediately upon cooling from the brazing temperature permits some displacement of the members and misalignment with respect to each other. In extreme cases, the members might actually become separated. It is therefore apparent that it is highly desirable, if not imperative, that a filler metal be employed which has a melting point close to the brazing temperature.

It is an object of my invention to provide a filler metal for brazing which has a melting point below a temperature of about 1000° F. but above 800° F. Another object is to provide a filler metal melting below 1000° F. which is especially adapted to form a brazed joint between members of aluminum or aluminum base alloys. A particular object is to provide a brazing alloy filler metal which can be employed to form a joint during the solution heat treatment of assembled age hardening aluminum base alloy members.

I have discovered that alloys melting below 1000° F. which contain from 33.3 to 52.5 per cent silver and 12.5 to 23.3 per cent aluminum in the proportion of approximately 1 part of aluminum to between 2 and 3.0 parts of silver, and from 30 to 50 per cent zinc form an excellent filler metal for brazing purposes, especially in furnace brazing. These alloys are characterized by having a melting point between 850 and 1000° F. and possessing an adequate strength for holding structural members together under operating conditions. They are especially useful in forming brazed joints between members of aluminum base alloys, and more particularly, members of age hardenable aluminum base alloys. In my preferred practice I employ from 36.6 to 48.8 per cent silver, 13.8 to 21.7 per cent aluminum in the proportion of 1 part of aluminum to between 2 and 3 parts of silver, and 35 to 45 per cent zinc. In choosing an alloy for brazing a particular age hardenable aluminum base alloy, it is generally desirable to select a composition that melts at or slightly below the temperature normally employed for solution heat treatment.

To enhance certain characteristics of the foregoing alloys and to assist in obtaining melting points in the lower portion of the 850 to 1000° F. range, it is desirable at times to include the additional elements antimony, lead, tin and bismuth. For the purpose of my invention these elements are considered as constituting a group of metals because of their similar chemical and physical properties as well as their similarity in behavior in the brazing alloys herein described. I have found that from 1 to 10 per cent of one or more of these metals may be advantageously employed, but the total amount should not in general exceed about 10 per cent. It is to be understood that small amounts of still other elements may be present in the alloys as impurities or as intentionally added ingredients without substantial adverse effect upon the beneficial properties of the alloys for brazing purposes. The alloy compositions claimed hereinbelow are intended to permit the inclusion of such minor alloying elements.

One of the advantages of having filler metal of the kind herein described which melts at a temperature close to that of the solution heat treating temperature of the alloy being brazed, is that in some cases brazing and solution heat treatment may be carried out simultaneously. In other instances where the member being brazed has received a solution heat treatment, another exposure to the same temperature only amounts to a repetition of a previous treatment and therefore introduces no new factor in the treatment of the alloy.

Although the filler metal alloys described above are particularly adapted to the brazing of solution heat treated aluminum base alloys, they are also useful in joining members of aluminum or aluminum base alloys that are not so treated. The advantage gained through use of my alloys in such cases is that the joining operation can be conducted at a lower temperature and with less danger of encountering difficulties sometimes attendant upon the use of higher brazing temperatures. The brazing alloys may also be employed in making joints between aluminum members and members of other metals or between non-aluminous metals.

In using the brazing alloy, suitable fluxes should be employed. Generally those fluxes which contain alkali metal halides are satisfactory. Such fluxes adapted to brazing are now available and have been found to give satisfactory results.

As an illustration of the operation of my invention, I may cite an example of the brazing of an assembly of aluminum alloy members. The members, composed of an alloy consisting of 1 per cent silicon, 0.6 per cent magnesium, 0.25 per cent chromium and balance aluminum and the usual impurities, were first cleaned with emery cloth and carbon tetrachloride. The cleaned members were assembled in an inverted T position and filler metal composed of 38 per cent silver, 17 per cent aluminum and 45 per cent zinc was placed along one side of the intersection. A suitable brazing flux was painted on the areas where the joint was to be made. The entire assembly was then placed in a furnace and heated up to about 980° F., the solution heat treating temperature for the alloy members, and held at this temperature for a period of 5 minutes. At the conclusion of this time the assembly was withdrawn from the furnace and cooled in an air blast. The filler metal was found to have flowed to the other side of the T joint and to have formed a satisfactory fillet on both sides of the joint. The jointed members were firmly attached to each other and the joint could only be ruptured with difficulty when pulling the members apart under tension.

Although certain examples have been given hereinabove, it will be appreciated that other compositions coming within the scope of my invention may be made and will give equally satisfactory results.

I claim:

1. A brazing alloy containing from 33.3 to 52.5 per cent silver and 12.5 to 23.3 per cent aluminum, the silver being in the proportion of 2 to 3.0 parts to 1 part of aluminum, and from 30 to 50 per cent zinc, said alloy being characterized by having a melting point below 1000° F.

2. A brazing alloy composed of from 33.3 to 52.5 per cent silver, 12.5 to 23.3 per cent aluminum, the silver being in the proportion of 2 to 3 parts to 1 part of aluminum, from 30 to 50 per cent zinc, and from 1 to 10 per cent of at least one of the metals of the group consisting of antimony, lead, tin and bismuth, the total amount of said metals not exceeding 10 per cent, said alloy being characterized by having a melting point below 1000° F.

3. A brazing alloy containing from 36.6 to 48.8 per cent silver and 13.8 to 21.7 per cent aluminum, the silver being in the proportion of 2 to 3 parts to 1 part of aluminum, and from 35 to 45 per cent of zinc, said alloy being characterized by having a melting point below 1000° F.

WALTER A. DEAN.